United States Patent [19]
Nunnink, Jr. et al.

[11] 3,810,664
[45] May 14, 1974

[54] TRAILER VEHICLE ANTI-THEFT PLUG ASSEMBLY

[75] Inventors: Charles P. Nunnink, Jr., Hawthorne; Marvin D. Bell, Chatsworth, both of Calif.

[73] Assignee: Recreation Creations, Inc., Chatsworth, Calif.

[22] Filed: Sept. 18, 1972

[21] Appl. No.: 290,239

[52] U.S. Cl. ................................. 280/507, 70/258
[51] Int. Cl. ............................................. B60d 1/12
[58] Field of Search .......... 280/507; 70/57, 58, 168, 70/169, 237, 258

[56] References Cited
UNITED STATES PATENTS
3,139,291  6/1964  Geresy ........................... 280/507
1,878,436  9/1932  Burroughs ........................ 70/168
3,237,969  3/1966  Geresy ........................... 280/507
3,410,580  11/1968  Longenecker .................... 280/507

FOREIGN PATENTS OR APPLICATIONS
1,238,782  4/1967  Germany ........................... 70/258

Primary Examiner—David Schonberg
Assistant Examiner—Leslie J. Paperner
Attorney, Agent, or Firm—Jessup & Beecher

[57] ABSTRACT

An anti-theft, lock-operated plug assembly capable of being removably mounted in the socket portion of a trailer hitch to prevent the trailer vehicle of which the hitch forms a part from being moved by a power vehicle having a trailer hitch ball. The assembly includes a disposable guide for drilling holes at predetermined positions in said socket portion to permit use of said anti-theft plug.

4 Claims, 7 Drawing Figures

TRAILER VEHICLE ANTI-THEFT PLUG ASSEMBLY

BACKGROUND OF THE INVENTION

Field of the Invention

A trailer vehicle anti-theft plug assembly.

Description of the Prior Art

During the past few years the use of trailers drawn by an automobile or other power vehicle has increased tremendously. Such trailers are normally drawn by a power vehicle by means of a hitch that includes a ball mounted on the rear portion of the power vehicle, which ball pivotally and removably engages the socket portion of the hitch that is permanently secured to the trailer vehicle. Normally when trailers are being drawn across country, the trailers will be disconnected from the power vehicle during an overnight stop. Upon occasion, such disconnected trailer vehicles have been stolen by use of an automobile having a trailer hitch ball mounted on the rear portion thereof, and the ball being inserted into the socket of the trailer to permit the latter to be drawn away.

The primary purpose in devising the present invention is to provide a lock-operated plug that is capable of being removably mounted in the socket portion of a trailer hitch, and when locked in position therein, prevents the trailer from being moved by use of a power vehicle having a trailer hitch ball mounted on the rear portion thereof, which ball were it not for the present invention, could be inserted into the socket portion of the trailer hitch.

SUMMARY OF THE INVENTION

A plug formed from a rigid material that is snugly and slidably insertable into a socket of a trailer hitch forming an integral and permanent part of a trailer vehicle. The socket is defined by a continuous wall in which two transversely aligned openings are formed.

The plug has a longitudinal extending cavity therein that communicates with two transverse, coaxially aligned bores which are formed in said plug. Two spring-loaded pins are mounted in the bores of said plug, and a cylindrical lock is mounted in the cavity. When the lock is in a first position the pins are likewise in first positions and situated within the bores formed in said plug. However, upon the lock being actuated to occupy a second position, the pins are likewise moved to second positions where they engage the openings formed in the wall defining the socket. When the plug is locked in position in the socket, it is impossible to use the ball of a trailer hitch to engage the socket and move the trailer vehicle.

The invention also includes a disposable guide for use in locating the openings in the wall defining the socket, and that serves to guide the drill in forming said openings in the wall.

A major object of the present invention is to supply an anti-theft plug assembly which may be easily installed in the socket portion of a trailer hitch that is a permanent part of a trailer vehicle, and when so mounted, prevents the unauthorized movement of the trailer vehicle by a power vehicle provided with the ball portion of a trailer hitch.

Another object of the invention is to provide an anti-theft plug assembly in which the engaging pins are rotatable, to prevent the pins from being drilled out and permit the unauthorized removal of the plug from the socket in which it is disposed.

A further object of the invention is to furnish an anti-theft plug assembly that is of simple mechanical structure, is easy to use, is relatively inexpensive to manufacture, and one that requires a minimum of maintenance attention.

DESCRIPTION OF THE PREFERRED EMBODIMENTS

Figure 1:
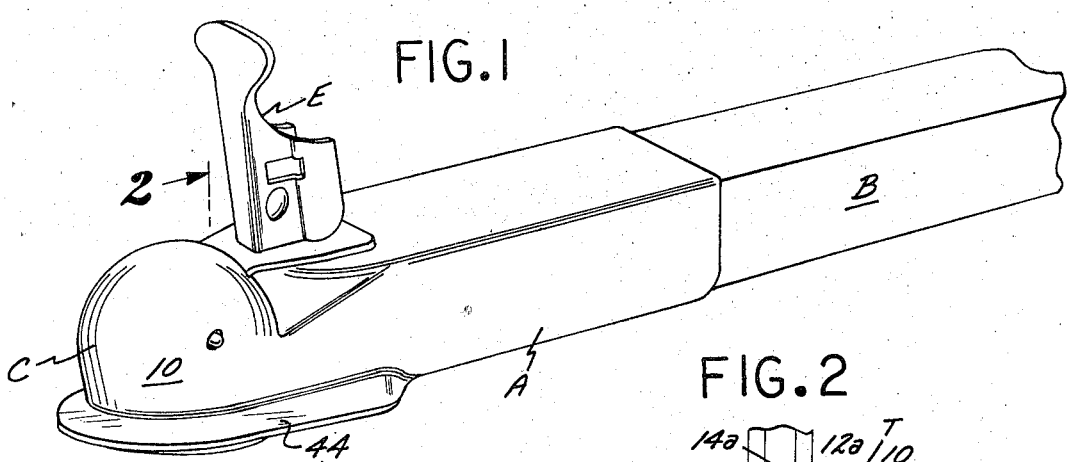
FIG. 1 is a perspective view of the pulled portion of a trailer hitch, with the anti-theft plug assembly removably locked into the socket portion thereof.
Figure 2:
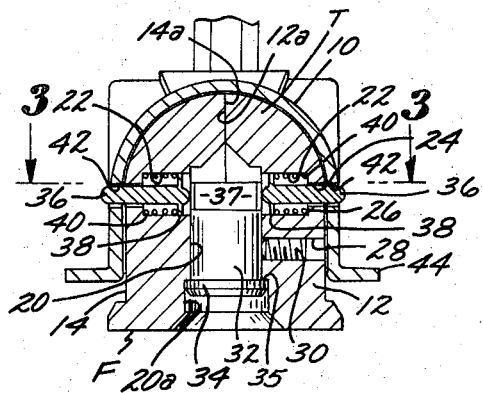
FIG. 2 is a transverse cross-sectional view of the trailer hitch and plug assembly, taken on the line 2—2 of FIG. 1.
Figure 3:
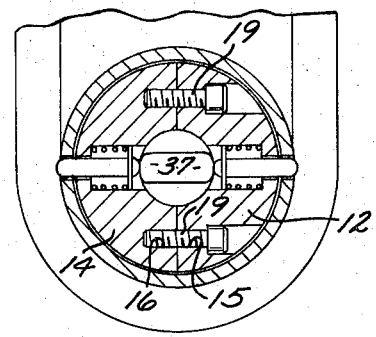
FIG. 3 is a cross-sectional view of the plug assembly and socket portion of the trailer hitch, taken on the line 3—3 of FIG. 2, with the plug assembly being in a locked position.

A pulled portion A of a trailer hitch is shown in FIG. 1 that is permanently secured by welding or the like to a member B forming a permanent part of the trailer vehicle (not shown) that is to be drawn. The portion A includes a socket C that is defined by a continuous wall 10 as illustrated in FIGS. 2 and 3. The socket C, as is conventional with trailer hitches, is adapted to pivotally and removably engage a ball D that is mounted on the rear portion of a power vehicle such as an automobile, tractor, or the like.

The pulled portion A includes a handle E pivotally supported thereon, which handle when pivoted to a position substantially parallel to the pulled portion moves a member (not shown) into contact with the ball D to maintain the ball in the socket C.

The anti-theft assembly T, as may best be seen in FIGS. 2-5 inclusive, preferably includes first and second semi-cylindrical members 12 and 14 that have flat, longitudinally extending surfaces 12a and 14a and are in abutting contact. Member 14 has two tapped transverse bores 16 formed therein that are in transverse alignment with bores 18 in the first member 12. Screws 19 extend through bores 18 and threadedly engage the tapped bores 16 to hold the semi-cylindrical members 12 and 14 together as an integral unit (FIGS. 2 and 3), with the members when so held defining a rigid plug F. The upper portions of the members 12 and 14 are of inwardly curving configuration to permit easy insertion of the plug F into the confines of the socket C.

When members 12 and 14 are held in abutting contact by the screws 19 they define an upwardly extending longitudinal cavity 20, as illustrated in FIG. 2, that is in communication with two transverse bores 22 defined in the members 12 and 14. Each of the bores 22 in the members 12 and 14 is in communication with a counterbore 24 of smaller diameter, with each bore and counterbore defining a body shoulder 26 at the junction thereof.

A transverse tapped bore 28 is formed in the first member 12 (FIG. 2), and is engaged by a set screw 30. A conventional cylindrical lock 32 is provided that snugly and slidably engages the cavity 20, and is rigidly held in position therein when the set screw 30 is tightened to bear against the exterior surface of the lock. The lock 32 has a flanged exterior end portion 34 that is in abutting contact with a body shoulder 35 formed in the members 12 and 14, as shown in FIG. 2. When the flanged end portion 34 is in such abutting contact with body shoulder 35, a rotatable lock bar 37 is in transverse alignment with the bores 22.

Two pins 36 are provided that are slidably mounted in the counterbores 24 and extend into the bores 22. The pins have heads 38 mounted on the adjacently disposed ends thereof, and two helical springs 40 are provided that at all times exert pressure on the heads 38 and tend to move the pins inwardly towards one another. When the lock bar 37 is rotated to the position shown in FIG. 4, the springs 40 move the pins 36 inwardly to the extent that they are positioned completely within the confines of the bores 22 and counterbores 24 to permit the anti-theft assembly T to be moved into or removed from the socket C.

Figure 5:
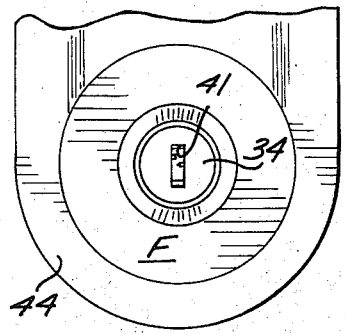
FIG. 5 is a bottom plan view of the plug assembly removably mounted in the socket portion of the trailer hitch.
Figure 4:
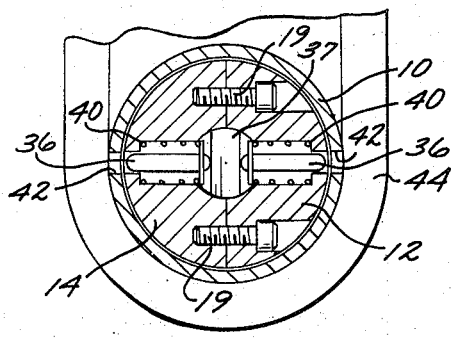
FIG. 4 is the same cross-sectional view shown in FIG. 3, but with the plug assembly being in an unlocked position.

A key-receiving opening 41 is provided in the end portion 34 of lock 32 as shown in FIG. 5, that is operable by a conventional key (not shown). When the anti-theft assembly T is disposed in the socket C as illustrated in FIG. 3, and the lock 32 actuated by the key to disposed the bar in transverse alignment with the pins, the springs 40 are compressed, and the pins 36 are moved outwardly to engage two transversely aligned openings 42 formed in the continuous wall 10 that defines the socket C, as may be seen in FIG. 2. The lower edge of wall 10 develops into a generally U-shaped flange 44, as best seen in FIGS. 1 and 2.

The members 12 and 14 are preferably of such length as to extend downwardly below the flanges 44 a substantial distance (FIG. 2). When the anti-theft assembly T is disposed in the socket C, as shown in Figure , with the lock bar 37 in the second position, it is impossible for a ball D of a trailer hitch to be inserted within the socket, and accordingly a vehicle that has the pulled portion A of a trailer hitch permanently secured thereto cannot be moved by use of a conventional trailer hitch of the ball type.

Figure 6:
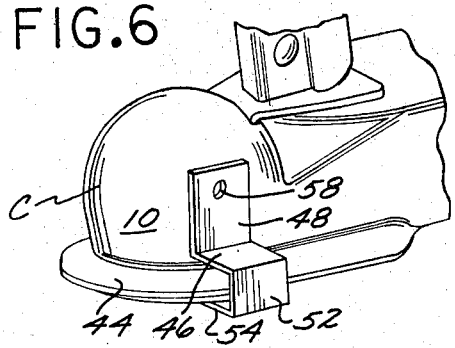
FIG. 6 is a disposable guide used in drilling transversely aligned openings in the wall defining the socket of the trailer hitch, which openings are so positioned as to be engageable by the spring-loaded pins of the plug assembly, when the lock forming a part thereof is disposed in the locked position as shown in FIG. 3.
Figure 7:
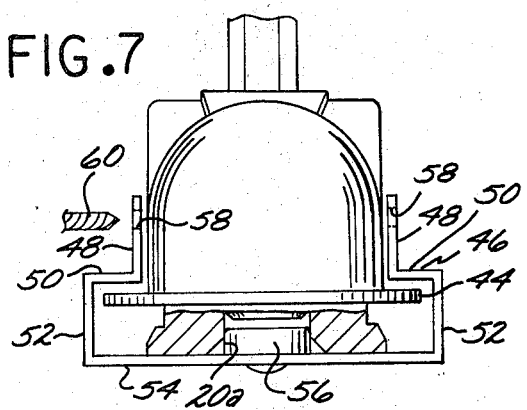
FIG. 7 is an end elevational view of the guide mounted on the plug and trailer hitch to permit pin-engageable openings to be drilled in the socket portion of the hitch.

To form the openings 42 in the wall 10 in such positions as to be engaged by the pins 36 when the lock bar 37 is pivoted to the second position as shown in FIG. 2, the disposable guide 46 may be employed, which is illustrated in FIGS. 6 and 7. The guide 46 includes two laterally spaced legs 48 that are adapted to be placed in close proximity to opposite sides of the wall 10, with the legs on the lower portions thereof developing into outwardly extending sections 50, which sections on their outer ends (FIG. 7) develop into second downwardly extending legs 52 that are connected by a transverse web 54. The legs 52, sections 50 and web 54 are formed from a resilient strip metallic material. A cylindrical protuberance 56 is mounted at the center of the web 54, as shown in FIG. 7, with the protuberance being adapted to slidably and snugly engage the lower portion 20a of the cavity 20 that is shown in FIGS. 2 and 7. The first legs 48 have transversely aligned openings 58 formed therein that serve as a guide for a power-driven drill 60 to form the openings 42 in the wall 10. After the openings 42 have been so drilled, the disposable guide 46 may be discarded.

The use and operation of the invention has previously been explained in detail, and need not be repeated.

We claimed:

1. An anti-theft combination for use on a trailer type vehicle having a pulled portion of a trailer hitch permanently secured thereto, said pulled portion being of the type wherein a socket is defined by a continuous wall that removably engages a ball on the pulling portion of said hitch, said combination comprising:
   a. a rigid plug that substantially fills said socket, which plug has a longitudinally extending cavity formed therein that is in communication with two coaxially aligned, oppositely extending transverse bores formed in said plug, said plug having a flat horizontal lower end that is disposed a predetermined distance below said socket when said plug is disposed therein;
   b. two pins slidably mounted in said bores, which pins are capable of occupying first positions in which said pins are disposed within said plug, with said pins being adapted to occupy second positions in which said pins have end portions thereof projecting outwardly from said plug into two transversely aligned openings in said wall defining said socket;
   c. spring means that at all times tend to maintain said pins in said first position;
   d. lock means in said cavity that partially fill the same and are capable of occupying first and second positions, which lock means when in said first position allows said pins to remain in said first position, and said lock means when in said second position moves said pins to said second position to hold said plug in said socket to prevent said ball from being inserted thereinto;
   e. first means for operating said lock to selectively move the same to either said first or said second position, with said lock when in said first position permitting said plug, pin, spring means, and lock means to be removed as an integral unit from said socket;
   f. second means for removably holding said lock means in said cavity, with said second means being so located that said lock means cannot be removed from said plug when said plug is disposed in said socket and said lock means and pins are in said second position; and
   g. third disposable means for aligning a rotating drill to permit said openings to be formed in said continuous wall of said socket in transverse alignment with said pins when said plug is disposed in said socket said third means including:
      1. two legs that extend on opposite sides of said continuous wall, which legs have axially aligned transverse openings formed therein through which said drill may pass to form said openings in said continuous wall;

2. a web that connects said legs; and
3. a protuberance on said web that extends upwardly in said cavity when said web is in contact with said lower end of said plug to center said third means relative to said socket.

2. An anti-theft assembly as defined in claim 1 wherein said first means is a key that engages said lock means.

3. An anti-theft assembly as defined in claim 1 wherein said plug is formed from a plurality of abutting segments, and said assembly further includes:

h. fourth means for removably holding said segments together to define said plug, with said second means being so disposed as to not be contactable when said lock means and pins are in said second positions and said plug is in said socket.

4. An anti-theft assembly as defined in claim 1 wherein said pins are rotatable to prevent said pins from being drilled out to effect unauthorized separation of said plug from said socket.

* * * * *